Patented Sept. 10, 1935

2,013,857

UNITED STATES PATENT OFFICE 2,013,857

ZIRCONIUM SILICON ALKALI METAL COMPOSITES AND METHODS OF MAKING SAME

Charles J. Kinzie, Niagara Falls, N. Y., assignor to The Titanium Alloy Manufacturing Company, New York, N. Y., a corporation of Maine No Drawing. Application July 20, 1932, Serial No. 623,605

15 Claims. (Cl. 23—15)

My invention relates generally to the derivation of zirconium compounds from the decomposition of zirconium ores and minerals, the most important of which are baddeleyite and zircon (zirconium silicate), as well as from mixtures of zirconium oxide and silica, which compounds result chiefly in the form of acid zirconium solutions that may be used in preparing various inorganic and organic salts of zirconium as required for uses in the various arts to which zirconium-containing products are adapted.

The objects of my invention are, among other things, the production of an improved zirconium silicon alkali metal composite in the form of an organic acid salt by novel and simplified methods of making same after the zircon or baddeleyite has been converted or decomposed according to the processes set forth in my U. S. Patent No. 1,609,826 of December 7, 1926 to form a zirconium compound readily dissolving in dilute acids with the silicon carried into the acid solution along with the zirconium. I have practiced my invention successfully by using both citric acid and tartaric acid which act to dissolve the zirconium, silicon and alkali metal as a result of the processes of my Patent No. 1,609,826 in which the zirconium, silicon and alkali metal remain in solution.

The first step in my improved methods consists in decomposing finely-milled zirconium silicate by heating with an alkali-metal compound, sodium carbonate for example, at temperature of about 900–950° C. to yield a product readily soluble in dilute acids. Other alkali-metal compounds such as sodium hydrate, sodium peroxide and sodium sulphide, or mixtures thereof, may be used; also potassium compounds such as potassium carbonate.

This roasted product consisting of sodium zirconium silicate is preferably milled with water to very fine state. The following charge will illustrate the procedure I prefer to use:

100 parts by weight sodium zirconium silicate and 96 parts by weight water are wet milled in a suitable ball mill until less than ½ of 1% remains on a 325 mesh sieve when a sample is tested for fineness. The mill is discharged, and the slurry thus obtained which consists mainly of sodium zirconium silicate in water suspension will have composition aproximately as follows:—

| | Percent |
|---|---|
| Zirconium (calculated as $ZrO_2$) | 20.65 |
| Silicon (calculated as $SiO_2$) | 10.49 |
| Sodium (calculated as $Na_2O$) | 14.06 |
| Water, etc. | 54.80 |
| | 100.00 |

For most purposes I prefer to proceed directly with the solution by means of citric acid, but in some cases it will be preferable to first remove the water soluble material from the slurry before proceeding with the dissolving of the zirconium, silicon and alkali in citric acid. The water dissolved material consists mainly of any excess alkali metal as well as small amounts of sodium aluminate, and sodium silicate, traces of chromium, vanadium, manganese, etc. which may be removed simply by separating the sodium zirconium silicate solids from the small amount of dissolved material by any suitable mechanical means. The water insoluble sodium zirconium silicate is then brought back to the form of slurry by dilution with water, and the solution in citric acid effected in same manner as in the preferred direct treatment procedure, but reducing the amount of citric acid in proportion to amount of material removed.

The alternative step of washing with water prior to solution in citric acid may prove important in case cruder ores are used or in case of ores or materials in which there is an excess of silicon mineral.

In case of mineral such as zirkite is used as raw material, it is desirable to add free silica so that proportion of $ZrO_2$ to $SiO_2$ is approximately $65ZrO_2$–$35SiO_2$.

*Preparation of the Zirconium Silicon Alkali Metal Citrate Solution*

Example A

I first form a charge of the following ingredients:

100 parts by weight of above sodium zirconium silicate slurry
59.1 parts by weight of citric acid
$(CO_2H.CH_2)_2C(OH)CO_2H$
63.5 parts by weight of water.

Preferably I first dissolve the citric acid in the water at about 80–90° C., and then add by suitable dispensing equipment this heretofore produced sodium zirconium silicate slurry to the citric acid solution which is stirred by suitable means. The sodium zirconium silicate dissolves almost completely leaving a small amount of insoluble residue which if recovered will constitute less than two parts of the 100 parts of sodium zirconium silicate slurry used. This represents a conversion of approximately 94% of the zircon originally used into dissolved condition. In this solution in either acid, neutral or alkaline condition, both the zirconium and silicon compounds are stable in the solution which remains fluid and stabilized. Whether this small amount of insoluble matter is removed from the citrate solution is of no importance; if retained the dried product would be more or less opaque.

The solution formed has a slight acid reaction and in contact with iron has a mild reactive effect with the iron. I have found that if the solution is neutralized by any suitable alkaline substance—ammonium hydrate for example,—and preferably made slightly alkaline, it then does not affect iron and may be handled without detriment in iron vessels. The neutralizing may be effected either before or after removing the insoluble residue. Substantially no precipitation occurs in this neutral or slightly alkaline zirconium silicon citrate solution.

After settling out the small amount of insoluble residue, the essentially clear neutral or slightly alkaline solution is then decanted and upon analysis has approximately the following composition:

|  | Percent |
|---|---|
| Silicon (calculated as $SiO_2$) | 4.07 |
| Zirconium (calculated as $ZrO_2$) | 7.96 |
| Titanium (calculated as $TiO_2$) | 0.02 |
| Iron (calculated as $Fe_2O_3$) | 0.01 |
| Carbon (C) | 8.21 |
| Sodium (calculated as $Na_2O$) | 5.95 |
| Water | 73.78 |
|  | 100.00 |

Index of refraction 1.490–1.495
Specific gravity 1.325

In the above table the percentage listed for zirconium (calculated as $ZrO_2$) also includes small amounts of aluminum and rare earths. In the event a cruder zircon was used these impurities would of course be proportionately higher.

For commercial purposes it may be of advantage to convert the solution into a solid so that it can be handled dry in packages and dissolved in water or other suitable solvents as required for use. This is accomplished in the following manner.

The solution is dried preferably at about 110° C., and this drying is best effected in thin film drying by causing the solution to be deposited onto the exterior of a heated metallic rotating drum from which the dried product is removed by suitable scrapers after the drum has partially completed a revolution. This part of process may be continuous with the solution contained in a trough under drum and a small section of drum dipping into the solution. As the drum rotates slowly, the film of solution adhering to drum is dried and is removed as it comes in contact with scrapers so located as to allow the film to travel the maximum permissible distance before removal.

This gum-like dry product obtained by drying in stationary dryer at 110° C. has approximately the following composition:

|  | Percent |
|---|---|
| Silicon (calculated as $SiO_2$) | 10.61 |
| Zirconium (calculated as $ZrO_2$) | 20.74 |
| Titanium (calculated as $TiO_2$) | 0.04 |
| Iron (calculated as $Fe_2O_3$) | 0.02 |
| Carbon (C) | 21.39 |
| Sodium (calculated as $Na_2O$) | 15.51 |
| Water | 31.69 |
|  | 100.00 |

The composition would naturally vary depending upon temperature and time of drying, but the above represents a composition obtainable readily by known drying equipment.

The product is a nearly transparent gum-like substance completely and readily soluble in water. Both in the solution as well as in the dried gum-like product the carbon is combined with the citrate produced with no free carbon present.

My improved citrate compound has several unusual properties which render it of advantage in the arts, viz:

(1) It remains in solution, or if in solid form it remains in water soluble form. This is unusual for any neutral material containing silicon which is likely to cause gelling and ultimate solidification.

(2) It is neutral or nearly so in reaction and therefore can be handled without danger to the user.

(3) The zirconium is not precipitated from solution by the reagents which ordinarily cause precipitation of zirconium. For example, alkalis may be added greatly in excess and the zirconium will not precipitate; also the addition of phosphates that usually precipitate zirconium has no effect and no precipitate forms.

(4) The solution of this citrate compound which is faintly lemon in color may be heated for long periods without causing a deposition of any solid constituent; when dried at 110° C. a gum-like mass is formed that is completely and readily soluble in water.

My improved citrate solution has certain of the properties of glue solutions and may be used as an adhesive and for joining certain solids as glass, wood or metal; also as a bond for refractories, abrasives. Such solution is a powerful dispersing agent and also has the property of forming coherent films to serve as temporary coatings on metal. Since this citrate solution carries a relatively high percentage of refractory inorganic material in solution, it may also be used to advantage as an impregnating agent. For example after filling the pores of the material, upon heating the citrate compound decomposes leaving sodium zirconium silicate.

*Example B*

In following Example B, I will illustrate a method for obtaining the citrate compound starting with $ZrO_2$, $SiO_2$ and sodium carbonate.

130 parts by weight of zirconium oxide ($ZrO_2$)
70 parts by weight of silica ($SiO_2$); and
200 parts by weight sodium carbonate ($Na_2CO_3$)

are intimately mixed, and then heated at temperature of about 920° C. to effect a combination of ingredients in which the zirconium, silicon along with the alkali will be soluble in dilute acids.

100 parts of this roasted product are preferably reduced by wet milling with
96 parts by weight of water and milled to fineness of about 325 mesh.

100 parts by weight of this zirconium slurry
59.1 parts by weight citric acid, and
63.5 parts by weight of water are then mixed in the following manner:

The citric acid crystals are first dissolved in the water by heating to about 95° C.; then the slurry is added to the stirred acid solution, and the stirring is continued until the zirconium, silicon and alkali metal combination has dissolved leaving only a little insoluble matter which may be settled out leaving an essentially clear solution of practically the same composition as for the solution given in Example A.

When evaporated to a solid in same manner as in prior Example A the solid gum-like product will be found to have substantially the same composition as given in the analysis in Example A.

I will now set forth Example C, which will serve to illustrate a case in which the water soluble material in the sodium zirconium silicate slurry has been removed before treatment with citric acid.

Example C

The zirconium slurry is washed by suitable means to remove water soluble matter and the insoluble product upon drying had the following composition by analysis:—

| | Percent |
|---|---|
| Zirconium (calculated as $ZrO_2$) | 52.42 |
| Silicon (calculated as $SiO_2$) | 25.08 |
| Sodium (calculated as $Na_2O$) | 21.75 |
| | 99.25 |

110 parts by weight of citric acid is dissolved in 208 parts by weight of water by heating to about 95° C.

100 parts by weight of this dry sodium zirconium silicate is now stirred in and digested while stirring until the zirconium, silicon and alkali metal are in solution leaving only a small amount of residual matter which in this example was allowed to settle leaving an essentially clear solution which was then decanted from the settled insoluble residue.

Upon analysis this solution was of approximately the following composition:—

| | Percent |
|---|---|
| Zirconium (calculated as $ZrO_2$) | 12.31 |
| Silicon (calculated as $SiO_2$) | 5.90 |
| Sodium (calculated as $Na_2O$) | 5.58 |
| Carbon (C) | 9.50 |
| Water ($H_2O$) | 66.71 |
| | 100.00 |

This solution yields upon drying a gum-like product, completely and readily soluble in water. In the solid product the relative proportions of zirconium, silicon, sodium, and carbon will remain same as in the solution, but the water will of course be lower and other ingredients higher.

In this example I did not add ammonia as this treatment is optional, and is only done to eliminate the slight corrosive effect which the mildly acid product would have if stored in iron containers.

Example C also serves to show how my improved citrate compound may be prepared by adding dry sodium zirconium silicate to the citric acid, and at same time illustrates how a purer and for some purposes more useful product can be produced. Such product, through its higher zirconium content relatively to its sodium content and also because the free sodium compounds have been removed, will at the higher temperature range serve as a bond, and at the same time will have greater refractory qualities than the product of Example A.

Example D

I may also produce a gum-like citrate product by decomposing zircon with potassium alkali-metal compounds such as potassium carbonate ($K_2CO_3$) by mixing the fine zircon powder with the $K_2CO_3$ and heating at about 950° C. to produce a potassium zirconium silicate compound soluble in dilute acids.

The charge consists of approximately 1000 parts by weight zircon milled to about 325 mesh, and
676 parts by weight $K_2CO_3$ was roasted for several hours at about 950° C.

The roasted product may then be wet milled with an equal amount of water and the slurry added to solution of citric acid, or the product may be dry milled and added dry to the citric acid or the wet milled product may be washed free of water soluble impurities and added either wet to citrate acid or it can be dried and added in form of a dry powder.

Using the wet milled product direct a suitable charge consists of 46 parts by weight of citric acid crystals dissolved by heating in
46 parts by weight of water heated to about 95° C.
100 parts by weight of potassium zirconium silicate slurry is then added and upon stirring and digesting at about 95° C. the potassium zirconium silicate will dissolve to large extent, forming a potassium zirconium citrate compound with the silicon in solution.

The solution can be dried to formation of a gum-like product easily dissolved in water.

The solution of this compound may be used instead of the corresponding sodium product.

For each part of $ZrO_2$ in solution there may be ½ part $SiO_2$ and 0.75 or less parts of $K_2O$ along with carbon as contained in the citrate compound which may be more or less in amount as compared with the zirconium (calculated as oxide). A mixture of sodium and potassium might also be used in decomposing the zircon and a sodium, potassium citrate compound is thereby produced.

I have also discovered that tartaric acid dissolves the zirconium silicate compound equally as well as citric acid. If the solution is kept sufficiently dilute and if ammonia is added while dilute and before silicon begins to cause gelling, this dilute solution remains fluid for a reasonable time with the zirconium and silicon in solution. However, upon evaporation to more concentrated form the silicon forms a gel and upon extraction with water it is found that the silicon is insoluble in water.

Therefore tartaric acid does not act in quite the same manner as does citric acid. However the following Example E shows how tartaric acid may be used.

Example E 99.4 parts by weight tartaric acid is dissolved in 400 parts by weight water by heating to about 95° C.; then 157.6 parts by weight of zirconium slurry of Example A is added and the charge is digested while stirring at about 95° C. until the soluble matter has dissolved leaving a small amount of insoluble matter. There is now added ammonium hydroxide in amount sufficient to neutralize the charge preferably making it slightly alkaline. This solution when used as bond, etc. possesses some of the properties of citrate compound. It should not be dried but should be kept in liquid form. The composition of this sodium zirconium silicon tartrate solution will be about as follows:—

| | Per cent |
|---|---|
| Zirconium (calculated as $ZrO_2$) | 5 |
| Silicon (calculated as $SiO_2$) | 2.5 |
| Sodium (calculated as $Na_2O$) | 3.4 |
| Carbon (C) | 5.0 |
| Water+nitrogen compounds | 84.1 |
| | 100.00 |

I do not wish to limit myself to the detailed procedure of the foregoing Examples A to E, as I may use alkali metal fluxes in reaction with the zircon or with zirconium oxide and silica that will yield compounds soluble in citric or tartaric acids to the production of my novel composite hereinbefore described.

In some instances it may prove desirable to have more silicon in the citrate or tartrate compound, in which event additional silica may be added to the raw mix before roasting and milling to form the zirconium silicate slurry, and then treating the slurry with citric acid or tartaric acid. Concentrations may be varied in the organic acid solutions as well as in the alkali metal zirconium silicate slurry to produce directly more or less concentrated organic derivatives of zirconium silicon alkali solutions and their resulting composites.

I claim as my invention:—

1. The method of making a zirconium silicon alkali metal composite which comprises heating zirconium-containing material mixed with a strongly alkaline alkali-metal compound to substantial decomposition to form an acid soluble alkali metal zirconium silicate, and treating said silicate with citric acid to obtain a citrate along with zirconium and silicon compounds that remain stable in the fluid and stabilized solution.

2. The method of making a zirconium silicon alkali metal composite which comprises heating zirconium-containing material mixed with a strongly alkaline alkali-metal compound to substantial decomposition to form an acid soluble alkali metal zirconium silicate, and treating said silicate with a hot solution of citric acid to obtain a citrate along with zirconium and silicon compounds that remain stable in the fluid and stabilized solution.

3. The method of making a zirconium silicon alkali metal composite which comprises heating zirconium-containing material mixed with a strongly alkaline alkali-metal compound to substantial decomposition to form an acid soluble alkali metal zirconium silicate, treating said silicate with citric acid to obtain a citrate along with zirconium and silicon compounds that remain stable in the fluid and stabilized solution, and drying the resulting solution to form a gum-like and readily water-soluble zirconium silicon alkali citrate.

4. The method of making a zirconium silicon alkali metal composite which comprises heating zirconium-containing material mixed with a strongly alkaline alkali-metal-compound to substantial decomposition to form an acid soluble alkali metal zirconium silicate, leaching the resulting product with water and removing the water soluble material therefrom, and treating the residue with a hot solution of citric acid to obtain a citrate along with zirconium and silicon compounds that remain stable in the fluid and stabilized solution.

5. The method of making a zirconium silicon alkali metal composite which comprises heating zirconium-containing material mixed with a strongly alkaline alkali-metal compound to substantial decomposition to form an acid soluble alkali metal zirconium silicate, leaching the resulting product with water and removing the water soluble material therefrom, treating the residue with a hot solution of citric acid to obtain a citrate along with zirconium and silicon compounds that remain stable in the fluid and stabilized solution, and drying the resulting solution to form a gum-like and readily water-soluble zirconium silicon alkali citrate.

6. The method of making a zirconium silicon sodium composite containing an organic acid derivative which comprises heating zirconium-containing material mixed with sodium carbonate to substantial decomposition to form an acid soluble sodium zirconium silicate, and treating said silicate with a hot solution of citric acid to obtain a citrate along with zirconium and silicon compounds that remain stable in the fluid and stabilized solution.

7. The method of making a zirconium silicon sodium citrate which comprises heating zirconium-containing material mixed with sodium carbonate to substantial decomposition to form an acid soluble sodium zirconium silicate, treating said silicate with a hot solution of citric acid to obtain a citrate along with zirconium and silicon compounds that remain stable in the fluid and stabilized solution, and drying the resulting solution to form a gum-like and readily water-soluble zirconium silicon sodium citrate.

8. The method of making a zirconium silicon sodium citrate which comprises heating zirconium-containing material mixed with sodium carbonate to substantial decomposition to form an acid soluble sodium zirconium silicate, mixing this dry milled silicate with a hot solution of citric acid, settling and removing the residual matter from said solution containing a citrate along with zirconium and silicon compounds that remain stable in the fluid and stabilized solution, and drying the resulting solution to form the zirconium silicon sodium citrate.

9. The method of making a zirconium silicon potassium citrate which comprises heating zirconium-containing material mixed with potassium carbonate to substantial decomposition to form an acid soluble potassium zirconium silicate, mixing this dry milled silicate with a hot solution of citric acid, removing the residual matter from the solution and drying the resulting solution to form the zirconium silicon potassium citrate.

10. In the method of making a zirconium silicon alkali metal citrate composition of matter from an acid soluble zirconium silicate, the step which consists in treating said silicate with citric acid to obtain a citrate along with zirconium and silicon compounds that remain stable in the fluid and stabilized solution.

11. In the method of making a zirconium silicon alkali metal citrate composition of matter from an acid soluble zirconium silicate, the steps which consist in treating said silicate with citric acid to obtain a citrate along with zirconium and silicon compounds that remain stable in the fluid and stabilized solution, and drying the resulting solution to form a gum-like and readily water-soluble zirconium silicon alkali citrate compound.

12. A zirconium silicon alkali metal composition of matter characterized as being a water-soluble, nearly transparent, gum-like salt of an organic acid obtained from a dried solution of alkali zirconium silicate in citric acid, and as containing, by analysis, zirconium oxide, silica, carbon, the oxide of an alkali and water with traces of iron and titanium.

13. A zirconium silicon sodium citrate composition of matter characterized as being clear, slightly acid in solution and as containing, by analysis, zirconium oxide, silica, carbon, sodium monoxide in substantial percentages in a major proportion of water with traces of iron and titanium.

14. A zirconium silicon sodium citrate composition of matter characterized as being a water-soluble, nearly transparent, gumlike salt of citric acid obtained from a dried solution of sodium zirconium silicate in citric acid and as containing, by analysis, zirconium oxide, silica, carbon, sodium monoxide and water with traces of iron and titanium.

15. A zirconium silicon alkali-metal composition of matter characterized as being a substantially neutral aqueous solution complex of zirconium, silicon and an alkali-metal citrate with traces of iron and titanium.

CHARLES J. KINZIE.